(12) United States Patent
Parameswaran et al.

(10) Patent No.: US 10,302,504 B1
(45) Date of Patent: May 28, 2019

(54) ON-DIE TEMPERATURE SENSING AND DIGITIZATION SYSTEM

(71) Applicant: Xilinx, Inc., San Jose, CA (US)

(72) Inventors: Suresh P. Parameswaran, Fremont, CA (US); Boon Y. Ang, Sunnyvale, CA (US); Ankur Jain, Sunnyvale, CA (US)

(73) Assignee: XILINX, INC., San Jose, CA (US)

( * ) Notice: Subject to any disclaimer, the term of this patent is extended or adjusted under 35 U.S.C. 154(b) by 308 days.

(21) Appl. No.: 15/418,544

(22) Filed: Jan. 27, 2017

(51) Int. Cl.
*G01K 7/01* (2006.01)
*G01K 7/16* (2006.01)
*G01K 15/00* (2006.01)

(52) U.S. Cl.
CPC .............. *G01K 7/16* (2013.01); *G01K 7/01* (2013.01); *G01K 15/005* (2013.01)

(58) Field of Classification Search
CPC .......................................... G01K 7/01–7/015
See application file for complete search history.

(56) References Cited

U.S. PATENT DOCUMENTS

| | | | |
|---|---|---|---|
| 5,795,068 A | 8/1998 | Conn, Jr. | |
| 6,002,991 A | 12/1999 | Conn, Jr. | |
| 6,067,508 A | 5/2000 | Conn, Jr. | |
| 6,847,010 B1 | 1/2005 | Hsieh et al. | |
| 7,078,259 B2* | 7/2006 | Casey | G01K 7/226 257/E21.546 |
| 7,225,099 B1 | 5/2007 | O'Dwyer | |
| 7,257,511 B1 | 8/2007 | Hsieh et al. | |
| 7,878,016 B2 | 2/2011 | Rotem et al. | |
| 8,182,139 B2* | 5/2012 | Fiennes | G01K 15/00 374/1 |
| 8,182,141 B1 | 5/2012 | Collins et al. | |
| 9,098,097 B2* | 8/2015 | Tadinada | G05F 5/00 |
| 2018/0058943 A1* | 3/2018 | Ge | G01K 7/01 |

OTHER PUBLICATIONS

Sharifi, Shervin et al., "Accurate Direct and Indirect On-Chip Temperature Sensing for Efficient Dynamic Thermal Management," IEEE Transactions on Computer-Aided Design of Integrated Circuits and Systems, Oct. 2010, pp. 1586-1599, vol. 29, No. 10, IEEE, Piscataway, New Jersey, USA.

Silicon Labs, "Using the On-Chip Temperature Sensor," AN103, Rev 1.3, Jul. 2013, pp. 1-15, Silicon Laboratories Inc., Sunnyvale, California, USA.

\* cited by examiner

*Primary Examiner* — Clayton E. LaBelle
*Assistant Examiner* — Leon W Rhodes, Jr.
(74) *Attorney, Agent, or Firm* — LeRoy D. Maunu

(57) ABSTRACT

The disclosure provides simple, low-cost but accurate systems and related methods for on-die temperature sensing typically using calibration and without the need for precision voltage references. In some implementations, the system utilizes two user selectable temperature sensing elements and two user selectable DACs to provide a digital code for the sensed temperature. In some implementations, the two sensing elements can be used to calibrate against each other. For example, calibration can be useful to account for silicon local/global variation. Typically, one of the temperature sensors is diode-based, while the other is resistor-based. However, those of skill in the art will recognize that, in accordance with the disclosure, more than two sensors can be provided that can be calibrated against one another.

20 Claims, 4 Drawing Sheets

ON-DIE TEMPERATURE SENSING AND DIGITIZATION SYSTEM

TECHNICAL FIELD

The disclosure generally relates to measurement of temperature in semiconductor devices, and more particularly to measurement of temperature on-die.

BACKGROUND

There are a variety of different on-die temperature sensing and digitization systems in the art. These systems are typically high precision approaches which may not need any calibration. However, these systems typically have a variety of drawbacks, as they typically require an on-die or off-chip precision voltage reference and complex circuitry. They also tend to occupy a larger silicon area, consume more power, and are generally harder to implement. Consequently, such sensors are typically limited to only very few locations on die, resulting in providing only very limited information on temperature distribution within the die. Moreover, these approaches tend to be medium to high cost solutions.

SUMMARY

The disclosure provides an on-die digital temperature sensing system for measuring a local temperature in a processor. A disclosed system includes, a temperature sensing circuit, and a feedback loop circuit. The temperature sensing circuit includes a diode-based temperature sensor configured to generate a first signal indicative of local temperature, and a resistor-based temperature sensor configured to generate a second signal indicative of local temperature. In various implementations, the temperature sensing circuit can also include a multiplexer coupled to the diode-based sensor and the resistor-based sensor, wherein the multiplexer can be configured to output a temperature signal based on at least one of the first signal and the second signal.

The feedback loop circuit can include a comparator that is configured to receive the temperature signal and a generated reference signal, compare the generated reference signal to the temperature signal, and generate a digital output signal that is indicative of whether the generated reference signal is greater or less than the temperature signal. The feedback loop circuit can further include at least one register coupled to the comparator for receiving the digital output signal and generating and/or storing a digital code indicative of the temperature signal based on the digital output signal. At least one digital-to-analog converter can also be provided. The digital-to-analog converter is coupled to the at least one register for generating the generated reference signal in response to receiving the digital code indicative of the temperature signal from the at least one register. An output of the at least one digital to analog converter can be coupled to the comparator for providing the generated reference signal to the comparator.

In some implementations, the at least one register can include at least a first clocked single bit register configured to receive the digital output signal. Additionally or alternatively, the at least one register can further include a state machine coupled to the first register, wherein the state machine can be configured to adjust in response to the digital output signal. In some implementations, the state machine can be configured to generate a twelve bit digital code indicative of the temperature signal, although it will be appreciated that a state machine configured to generate a lower or higher bit code can be provided. In various implementations, the system can be configured to only utilize one of the first signal and the second signal at a given time to generate the temperature signal. If desired, the system can be configured to permit a user to determine whether the first signal or the second signal is to be used to generate the temperature signal.

In some implementations, the system can include a plurality of digital to analog converters coupled to the at least one register. The plurality of digital to analog converters can have multiplexed outputs coupled to the comparator. If desired, the system can be configured to utilize a signal generated by only one of the digital to analog converters at a given time, and if so configured, a user can be permitted to select which digital to analog converter is to be utilized. In some implementations, the system can be configured to alternate between utilizing the first signal and the second signal to generate the temperature signal.

In some implementations, the system can be further configured to calibrate the local temperature by comparing digital outputs generated using each of the first signal and the second signal. In some implementations, the temperature sensing circuit can further include at least one additional temperature sensor. In various implementations, a processor including an on-die digital temperature sensing system as disclosed herein can be provided, embedded therein.

As further disclosed herein, a system for controlling temperature in a processor can be provided including a temperature sensing system as set forth herein, at least one circuit configured to receive the digital code indicative of the temperature signal, and at least one circuit for determining the temperature of the processor by comparing the digital code to values in a lookup table. If desired, the system can further include a cooling system that is configured to be activated if the temperature detected by the system exceeds a threshold value. The system can further include a plurality of temperature sensing circuits spatially distributed within the processor to monitor the temperature at a plurality of locations in the processor. The system can further include a plurality of digital to analog converters coupled to the at least one register, the plurality of digital to analog converters having multiplexed outputs. The system can be configured to permit a user to select which digital to analog converter is to be utilized. If desired, the system can be configured to alternate between utilizing the first signal and the second signal to generate the temperature signal. The system can be further configured to estimate, and/or calibrate, the local temperature by comparing digital outputs generated using each of the first signal and the second signal. Other features will be recognized from consideration of the Detailed Description and Claims, which follow.

BRIEF DESCRIPTION OF THE DRAWINGS

Various aspects and features of the devices, systems, and related methods will become apparent upon review of the following detailed description and upon reference to the drawings in which.

DETAILED DESCRIPTION

Figure 1:
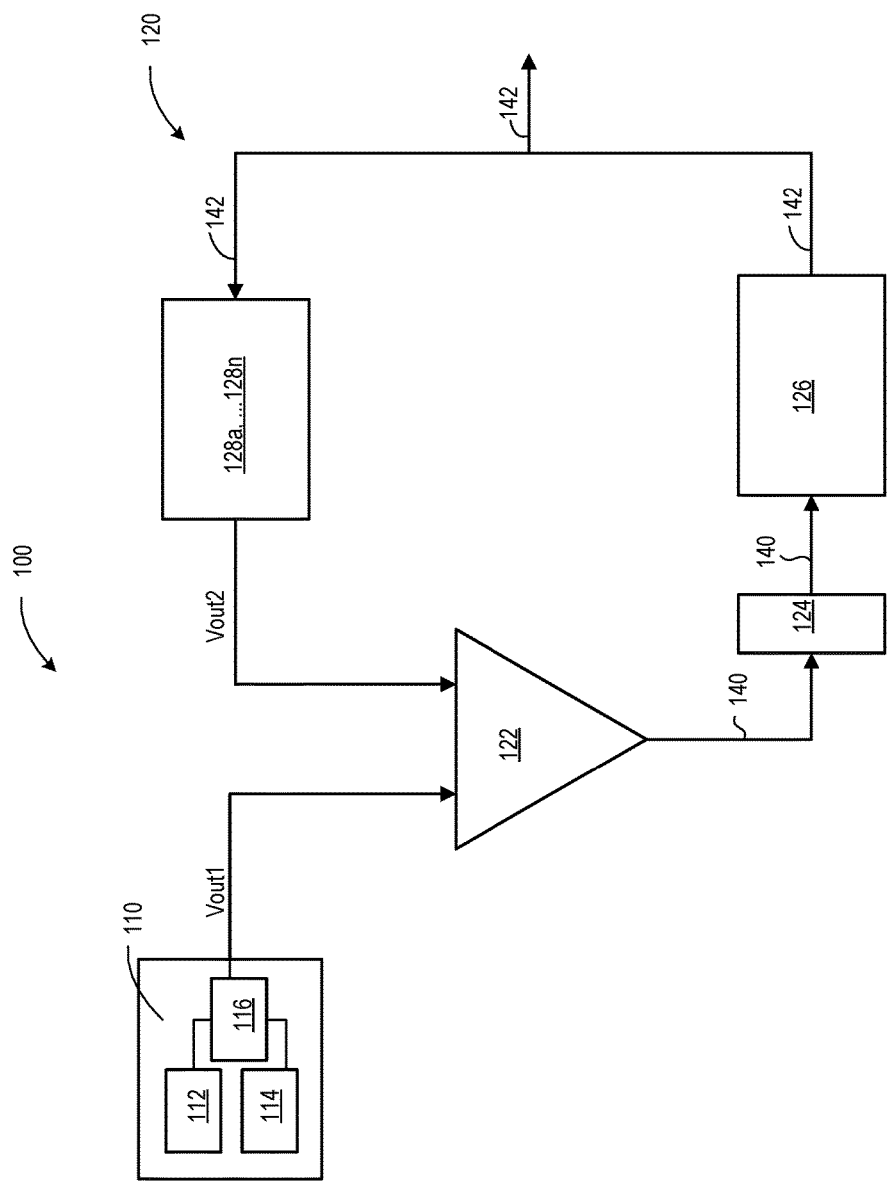
FIG. 1 depicts a block diagram of a system for on-die temperature measurement in accordance with the present disclosure.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosure provides simple, low-cost but accurate systems and related methods for on-die temperature sensing typically using calibration and without the need for precision voltage references. In some implementations, the system utilizes two user selectable temperature sensing elements and two user selectable DACs to provide a digital code for the sensed temperature. In some implementations, the two sensing elements can be used to calibrate against each other. For example, calibration can be useful to account for silicon local/global variation. Typically, one of the temperature sensors is diode-based, while the other is resistor-based. However, those of skill in the art will recognize that, in accordance with the disclosure, more than two sensors can be provided that can be calibrated against one another.

Some of advantages of the disclosed implementations include (i) there is no need for any precision voltage reference, (ii) the circuitry is relatively simple, (iii) the system occupies less silicon area than prior devices, (iv) power consumption is lower, (v) cost is lower, and (vi) implementation is significantly easier. Since the system is self-contained, it is generally immune to ground-bounce and is therefore ideal for distributing in several locations within the die, thus providing detailed information on temperature distribution within the die. Distribution in several spots in a large die can also be useful for obtaining the dynamic thermal profile within the die, and also facilitate achieving customized temperature control by region of the die. The disclosed implementations can be particularly useful for detecting on-die temperature of power-hungry chips. The system can accordingly trigger additional cooling solutions when a certain temperature level is exceeded.

For purposes of illustration, and not limitation, as illustrated in FIG. 1, in accordance with the disclosure, an on-die digital temperature sensing system 100 for measuring a local temperature in a processor is presented.

System 100 includes a temperature sensing circuit 110. Circuit 110 includes a diode-based temperature sensor 112 configured to generate a first signal indicative of local temperature, as well as a resistor-based temperature sensor 114 configured to generate a second signal indicative of local temperature.

Figures 2A, 2B:
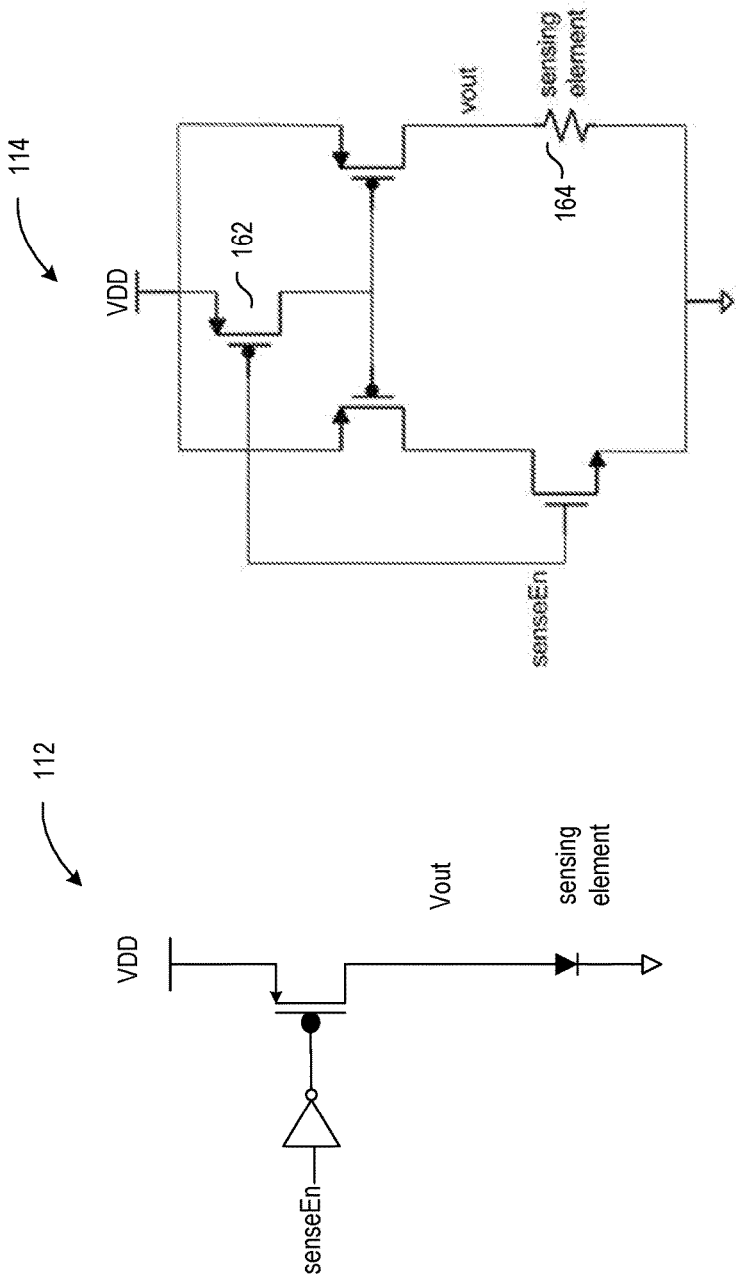
FIG. 2A and FIG. 2B depicts schematic diagrams of diode-based and resistor-based sensing elements in accordance with the present disclosure.

Non-limiting examples of temperature sensors 112, 114 are presented in FIG. 2A and FIG. 2B, respectively.

Temperature sensor circuit 112 illustrated in FIG. 2B may be actuated or turned on by application of an enable signal ("senseEn") that is directed through an inverter to the gate of a PMOS transistor that turns on the circuit and permits current to flow based on an applied voltage ($V_{DD}$) through a diode that acts as a sensing element. Specifically, the forward bias voltage for the diode is a function of temperature. Thus, as the temperature of the sensing element varies, so will the resulting forward bias voltage, which will become Vout1 if element 112 is selected to be operable.

Temperature sensor 114, is similarly activated by applying an enable signal ("senseEn") to the gate of PMOS transistor 162 to cause current to flow through the resistive sensing element 164. The circuit is configured to apply a substantially constant current (ideally, a constant current) through the circuit. Since the resistance of the sensing element is a function of temperature, and since the voltage drop is a function of the resistance and the constant current, the voltage will vary in tandem with the resistance, which is a function of temperature. Thus, the resulting signal, when circuit 114 is enabled, can be selected to be Vout1 (FIG. 1).

While the particular circuits 112, 114 are illustrated, the present disclosure is intended to encompass any suitable temperature sensing circuits based on diodes, resistors, and/or other types of components such as bandgap sensors, and the like. The present circuits are illustrated to demonstrate the potential simplicity of the disclosed implementations.

Continuing now with reference to FIG. 1, temperature sensing circuit 110 further includes a multiplexer 116 coupled to the diode-based sensor 112 and the resistor-based sensor 114, as well as any other circuits within circuit 110, if so configured. The multiplexer 116 is configured to output a temperature signal Vout1 based on at least one of the first signal and the second signal.

In further accordance with the disclosure, and as presented in FIG. 1, the system 100 further includes a feedback loop circuit 120. As illustrated, circuit 120 includes a comparator 122. The comparator 122 is configured to receive the temperature signal Vout1 and a generated reference signal Vout2 (discussed below), compare the generated reference signal Vout2 to the temperature signal Vout1, and generate a digital output signal 140 that is indicative of whether the generated reference signal Vout2 is greater or less than the temperature signal Vout1.

As further illustrated in FIG. 1, feedback loop circuit 120 further includes register 124 and state machine 126 coupled to the comparator 122 for receiving the digital output signal 140 and generating and/or storing a digital code 142 that is indicative of the temperature signal Vout1 based on the digital output signal 140. Register 124, as depicted, can be a clocked single bit register configured to receive the digital output signal 140, wherein the comparator digital output is captured in the register 124.

State machine 126 is coupled to the first register 124 and is configured to adjust the digital code 142 in response to the digital output signal 140. In some implementations, the state machine 126 can be a 12-bit state-machine whose contents can be either incremented or decremented. In such an implementation, state machine 126 can be configured to generate a twelve bit digital code 142 indicative of the temperature signal Vout1. The state-machine code will move up or down by 1 binary-state depending on the relative values of Vout1 and Vout2. Thus, with each clock pulse, the system will adjust by 1 binary-state and will eventually stabilize when Vout1=Vout2. The digital code in the state machine 126 will then be sent out by the state machine as the binary equivalent of Vout1. As will be appreciated, state machine 126 need not be a 12 bit device, but may alternatively be of higher or lower bits depending on the resolution desired in the temperature measurement data.

Feedback loop circuit 120 further includes at least one (and preferably a plurality of) digital-to-analog converters ("DACs") 128 coupled to the at least one register 124 for generating the generated reference signal Vout2 in response to receiving the digital code 142. An output of the digital-to-analog converter is coupled to the comparator 122 for providing the generated reference signal Vout2 to the comparator 122. In one implementation, the DACs include two 12-bit DACs.

The outputs of the DACs are multiplexed, and one is used at a given time such that data can be separated from each type of temperature sensor 112, 114. The DACs are preferably user selectable as with the temperature sensors. The DACs and the temperature sensors are preferably independently selectable, such that two temperature sensors and two DACs can be combined to create four different circuit combinations to average out errors. If desired, the system can be programmed to simply alternate between the temperature sensors. In accordance with a further aspect, the system can be further configured to calibrate the local temperature by comparing digital outputs generated using each of the first signal and the second signal. As will be appreciated, more than two temperature sensors can be provided, as well as more than two DACs.

The disclosed temperature sensing system can be provided on any desired microprocessor. Moreover, the system can be provided with additional features that interact with the temperature measurement system.

Figure 3:
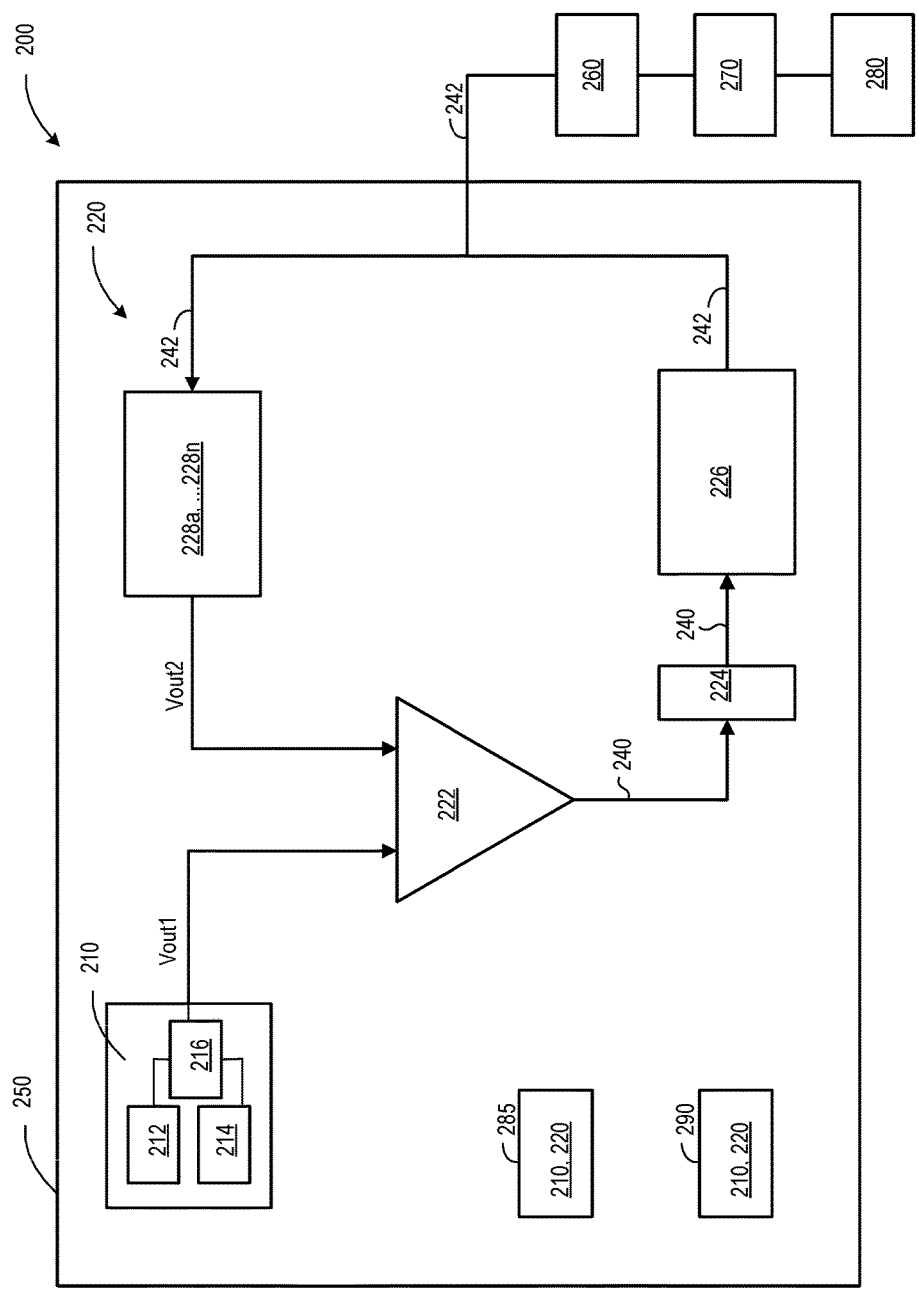
FIG. 3 is a block diagram of a further system for on-die temperature measurement and control in accordance with the present disclosure.

For purposes of illustration, and not limitation, FIG. 3 illustrates a system 200 for controlling temperature in a processor 250. The on-die digital temperature sensing system is essentially the same as that depicted and described in FIG. 1, and includes a temperature sensing circuit 210 and a feedback loop circuit 220. Similarly, the temperature sensing circuit 210 includes a diode-based temperature sensor 212 configured to generate a first signal indicative of local temperature, a resistor-based temperature sensor 214 configured to generate a second signal indicative of local temperature, and a multiplexer 216 coupled to the diode-based sensor 212 and the resistor-based sensor 214. The multiplexer 216 is configured to output a temperature signal Vout1 based on at least one of the first signal and the second signal. The feedback loop circuit 220 includes a comparator 222 that is configured to receive the temperature signal Vout1 and a generated reference signal Vout2, compare the generated reference signal Vout2 to the temperature signal Vout1, and generate a digital output signal 240 that is indicative of whether the generated reference signal Vout2 is greater or less than the temperature signal Vout1.

As with the circuitry of FIG. 1, the registers 224, 226 are coupled to the comparator 222 for receiving the digital output signal 240 and storing a digital code 242 indicative of the temperature signal Vout1 based on the digital output signal. One or more digital-to-analog converters 228 are coupled to register 226 for generating the reference signal Vout2 in response to receiving the digital code 242 indicative of the temperature signal Vout1 from register 226. The output of the DAC(s) 228 is coupled to the comparator 222 for providing the generated reference signal Vout2 to the comparator 222.

In further accordance with the disclosure, circuit 220 is coupled to a further circuit 260 that is configured to receive the digital code indicative of the temperature signal Vout1. Circuit 260 is coupled to a further circuit 270 for determining the temperature of the processor by comparing the digital code to values in a lookup table (not shown). The values in the lookup table can be established by empirical experimentation and/or computation.

The system 200 can be further provided with a cooling system 280 that is configured to be activated if the temperature detected by the system 200 exceeds a threshold value in order to maintain the processor 250 within acceptable temperature limits for operation. The cooling system 280 can include one or more of a cooling fan, micro heat pipes, an active heat exchanger with a liquid heat exchange medium, and the like.

If desired, the system 200 can be provided with multiple temperature sensing circuits (e.g., 100) spatially distributed across the processor 250 to monitor the temperature at a plurality of locations on the processor 250. Circuit blocks 285 and 290 are representative of additional instances of the temperature sensing circuit 210 and feedback loop 220 at different locations. The system 200 can accordingly be provided with multiple digital to analog converters (228a . . . 228n) that correspond with each temperature sensing circuit. As with the circuitry of FIG. 1, the system 200 can be configured to permit a user to select which digital to analog converter (228a . . . 228n) to use, and independently (preferably), select which temperature sensor, is to be utilized. As with system 100, system 200 can be configured to alternate between utilizing the first signal and the second signal to generate the temperature signal Vout1. The system can be still further configured to estimate the local temperature by comparing digital outputs generated using each of the temperature sensing circuit signals.

Alternatively, several instances of the system 200 can be spatially distributed within a semiconductor chip. Each instance can sense/digitize the local temperature which can be read-out subsequently.

Figure 4:
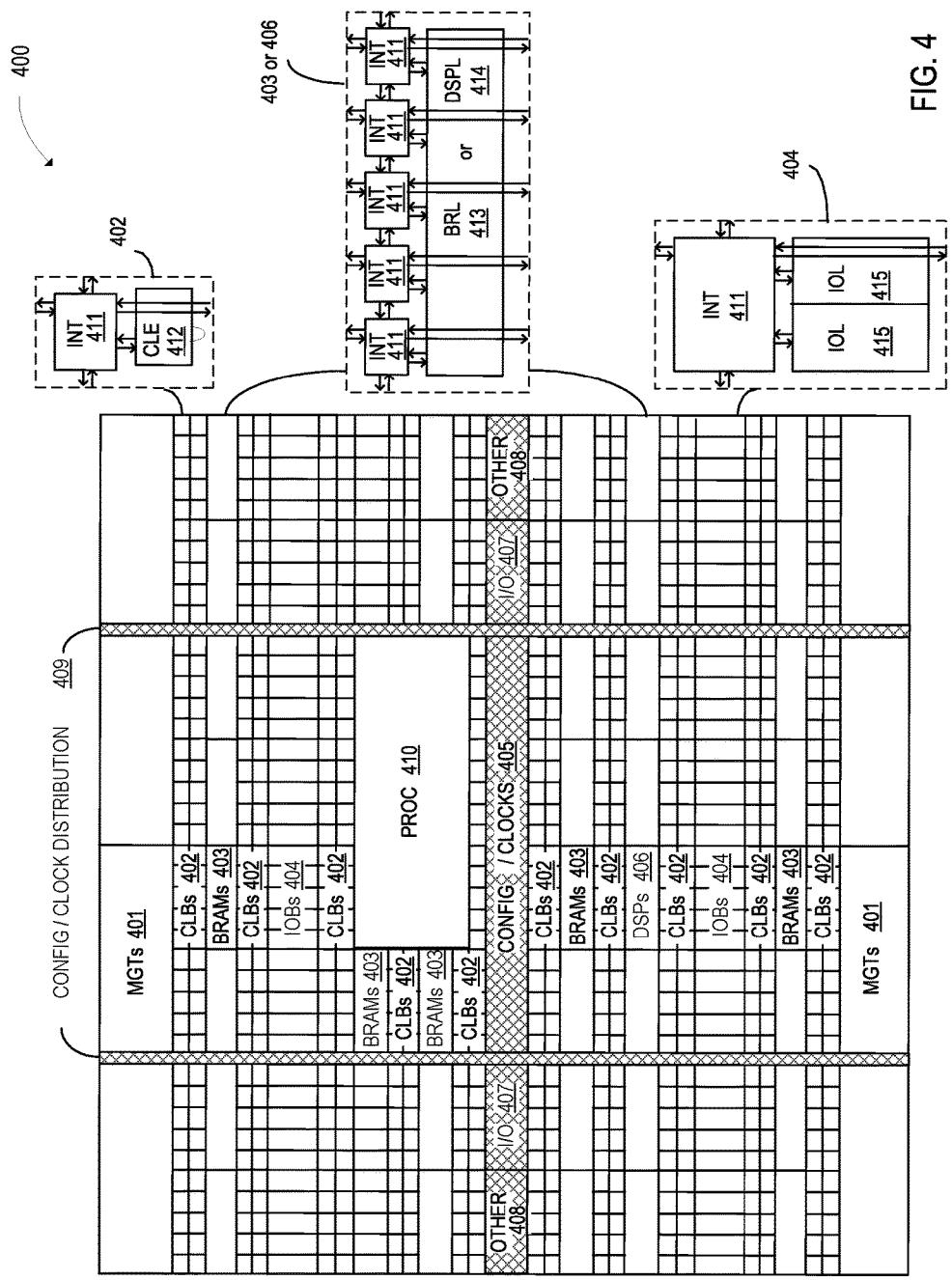
FIG. 4 shows a programmable integrated circuit (IC) 400 on which the disclosed circuits and processes may be implemented.

FIG. 4 shows a programmable integrated circuit (IC) 400 on which the disclosed circuits and processes may be implemented. The programmable IC may also be referred to as a System on Chip (SOC) that includes field programmable gate array logic (FPGA) along with other programmable resources. FPGA logic may include several different types of programmable logic blocks in the array. For example, FIG. 4 illustrates a programmable IC 400 that includes a large number of different programmable tiles including multi-gigabit transceivers (MGTs) 401, configurable logic blocks (CLBs) 402, blocks of random access memory (BRAMs) 403, input/output blocks (IOBs) 404, configuration and clocking logic (CONFIG/CLOCKS) 405, digital signal processing blocks (DSPs) 406, specialized input/output blocks (I/O) 407, for example, clock ports, and other programmable logic 408 such as digital clock managers, analog-to-digital converters, system monitoring logic, and so forth. Some programmable IC having FPGA logic also include dedicated processor blocks (PROC) 410 and internal and external reconfiguration ports (not shown).

In some FPGA logic, each programmable tile includes a programmable interconnect element (INT) 411 having standardized connections to and from a corresponding interconnect element in each adjacent tile. Therefore, the programmable interconnect elements taken together implement the programmable interconnect structure for the illustrated FPGA logic. The programmable interconnect element INT 411 also includes the connections to and from the programmable logic element within the same tile, as shown by the examples included at the top of FIG. 4.

For example, a CLB 402 can include a configurable logic element CLE 412 that can be programmed to implement user logic, plus a single programmable interconnect element INT 411. A BRAM 403 can include a BRAM logic element (BRL) 413 in addition to one or more programmable interconnect elements. Often, the number of interconnect elements included in a tile depends on the height of the tile. In the pictured implementation, a BRAM tile has the same height as five CLBs, but other numbers (e.g., four) can also be used. A DSP tile 406 can include a DSP logic element (DSPL) 414 in addition to an appropriate number of programmable interconnect elements. An IOB 404 can include, for example, two instances of an input/output logic element (IOL) 415 in addition to one instance of the programmable interconnect element INT 411. As will be clear to those of skill in the art, the actual I/O bond pads connected, for example, to the I/O logic element 415, are manufactured using metal layered above the various illustrated logic blocks, and typically are not confined to the area of the input/output logic element 415.

In the pictured implementation, a columnar area near the center of the die (shown shaded in FIG. 4) is used for configuration, clock, and other control logic. Horizontal areas 409 extending from the column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 4 include additional logic blocks that disrupt the regular columnar structure making up a large part of the programmable IC. The additional logic blocks can be programmable blocks and/or dedicated logic. For example, the processor block PROC 410 shown in FIG. 4 spans several columns of CLBs and BRAMs.

Note that FIG. 4 is intended to illustrate only an example of programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 4 are provided purely as examples. For example, in an actual programmable IC, more than one adjacent column of CLBs is typically included wherever the CLBs appear, to facilitate the efficient implementation of user logic.

For the various flow diagrams depicted herein, the particular orders of the blocks and associated functions are provided as examples. The ordering is not necessarily limiting and can be varied according to various implementations.

Those skilled in the art will appreciate that various alternative computing arrangements, including one or more processors and a memory arrangement configured with program code, would be suitable for hosting the processes and data structures that may carry out functions disclosed herein. In addition, the processes may be provided via a variety of computer-readable storage media or delivery channels such as magnetic or optical disks or tapes, electronic storage devices, or as application services over a network.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems that use RAM circuits. Other aspects and features will be apparent to those skilled in the art from consideration of the specification. The portions of the methods and system may be implemented as one or more processors configured to execute software, as an application specific integrated circuit (ASIC), or as a logic on a programmable logic device. Moreover, the various circuits identified herein may share hardware circuitry, such as use of a common computer processing unit or digital processing unit. It is intended that the specification and drawings be considered as examples only, with a true scope of the invention being indicated by the following claims.

What is claimed is:

1. An on-die digital temperature sensing system for measuring a local temperature, comprising:
    a temperature sensing circuit including:
        a diode-based temperature sensor configured to generate a first signal indicative of local temperature;
        a resistor-based temperature sensor configured to generate a second signal indicative of local temperature; and
        a multiplexer coupled to the diode-based sensor and the resistor-based sensor, the multiplexer configured to output a temperature signal based on at least one of the first signal and the second signal; and
    a feedback loop circuit including:
        a comparator that is configured to: receive the temperature signal and a generated reference signal, compare the generated reference signal to the temperature signal, and generate a digital output signal that is indicative of whether the generated reference signal is greater or less than the temperature signal;
        at least one register coupled to the comparator for receiving the digital output signal and for performing at least one of generating and storing a digital code indicative of the temperature signal based on the digital output signal; and
        at least one digital-to-analog converter coupled to the at least one register for generating the generated reference signal in response to receiving the digital code indicative of the temperature signal from the at least one register, an output of the at least one digital to analog converter being coupled to the comparator for providing the generated reference signal to the comparator.

2. The on-die digital temperature sensing system of claim 1, wherein the at least one register includes at least a first clocked single bit register configured to receive the digital output signal.

3. The on die digital temperature sensing system of claim 2, wherein the at least one register further includes a state machine coupled to the first register, the state machine being configured to adjust the digital code in response to the digital output signal.

4. The on-die digital temperature sensing system of claim 3, wherein the state machine is configured to generate a twelve bit digital code indicative of the temperature signal.

5. The on-die digital temperature sensing system of claim 1, wherein the system only utilizes one of the first signal and the second signal at a given time to generate the temperature signal.

6. The on-die digital temperature sensing system of claim 5, wherein the system is configured to permit a user to determine whether the first signal or the second signal is to be used to generate the temperature signal.

7. The on-die digital temperature sensing system of claim 1, wherein the system includes a plurality of digital to analog converters coupled to the at least one register, the plurality of digital to analog converters having multiplexed outputs coupled to the comparator.

8. The on-die digital temperature sensing system of claim 7, wherein the system is configured to utilize a signal generated by only one of the digital-to-analog converters at a given time.

9. The on-die digital temperature sensing system of claim 8, wherein the system is configured to permit a user to select which digital to analog converter is to be utilized.

10. The on-die digital temperature sensing system of claim 1, wherein the system is configured to alternate between utilizing the first signal and the second signal to generate the temperature signal.

11. The on-die digital temperature sensing system of claim 10, wherein the system is further configured to calibrate the local temperature by comparing digital outputs generated using each of the first signal and the second signal.

12. The on-die digital temperature sensing system of claim 1, wherein the temperature sensing circuit further includes at least one additional temperature sensor.

13. A system for controlling temperature in a processor, comprising:
   a processor including at least one on-die digital temperature sensing systems for measuring a local temperature in the processor, the system including a temperature sensing circuit and a feedback loop circuit;
   wherein the temperature sensing circuit includes:
      a diode-based temperature sensor configured to generate a first signal indicative of local temperature;
      a resistor-based temperature sensor configured to generate a second signal indicative of local temperature;
      a multiplexer coupled to the diode-based sensor and the resistor-based sensor, the multiplexer configured to output a temperature signal based on at least one of the first signal and the second signal;
   wherein the feedback loop circuit includes:
      a comparator that is configured to: receive the temperature signal and a generated reference signal, compare the generated reference signal to the temperature signal, and generate a digital output signal that is indicative of whether the generated reference signal is greater or less than the temperature signal;
      at least one register coupled to the comparator for receiving the digital output signal and for performing at least one if generating and storing a digital code indicative of the temperature signal based on the digital output signal; and
      at least one digital-to-analog converter coupled to the at least one register for generating the generated reference signal in response to receiving the digital code indicative of the temperature signal from the at least one register, an output of the at least one digital to analog converter being coupled to the comparator for providing the generated reference signal to the comparator;
   at least one circuit configured to receive the digital code indicative of the temperature signal; and
   at least one circuit for determining the temperature of the processor by comparing the digital code to values in a lookup table.

14. The system for controlling temperature in a processor of claim 13, further comprising a cooling system that is configured to be activated if the temperature detected by the system exceeds a threshold value.

15. The system for controlling temperature in a processor of claim 13, wherein the system includes a plurality of temperature sensing circuits spatially distributed within the processor to monitor the temperature at a plurality of locations in the processor.

16. The system for controlling temperature in a processor of claim 13, wherein the system includes a plurality of digital to analog converters coupled to the at least one register, the plurality of digital to analog converters having multiplexed outputs.

17. The system for controlling temperature in a processor of claim 16, wherein the system is configured to permit a user to select which digital to analog converter is to be utilized.

18. The system for controlling temperature in a processor of claim 13, wherein the system is further configured to calibrate the local temperature by comparing digital outputs generated using each of the first signal and the second signal.

19. The system for controlling temperature in a processor of claim 13, wherein the system includes a plurality of on-die digital temperature sensing systems that are each configured to sense and digitize local temperature at a plurality of locations across the processor.

20. The system of claim 13, wherein the system only utilizes one of the first signal and the second signal at a given time to generate the temperature signal.

* * * * *